(12) United States Patent
Osawa

(10) Patent No.: US 8,817,279 B2
(45) Date of Patent: Aug. 26, 2014

(54) IMAGE FORMING APPARATUS, METHOD FOR CONTROLLING THE IMAGE FORMING APPARATUS, AND STORAGE MEDIUM

(75) Inventor: Takaharu Osawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 416 days.

(21) Appl. No.: 13/216,500

(22) Filed: Aug. 24, 2011

(65) Prior Publication Data

US 2012/0050780 A1 Mar. 1, 2012

(30) Foreign Application Priority Data

Aug. 26, 2010 (JP) ................................. 2010-189515

(51) Int. Cl.
*G06K 15/02* (2006.01)
(52) U.S. Cl.
USPC ........................................ 358/1.13; 358/1.15
(58) Field of Classification Search
CPC ... G06F 3/1293; G06F 3/1296; G06F 9/4881; G06F 2209/485; H04N 1/00912; H04N 1/32101; G06K 15/02
USPC ................................. 358/1.13, 1.1
See application file for complete search history.

(56) References Cited

U.S. PATENT DOCUMENTS

| | | | | |
|---|---|---|---|---|
| 7,376,442 B2 * | 5/2008 | Yoshioka | ................... | 455/556.2 |
| 2003/0215256 A1 * | 11/2003 | Osada | .............................. | 399/81 |

FOREIGN PATENT DOCUMENTS

| | | |
|---|---|---|
| CN | 1416054 A | 5/2003 |
| CN | 1684472 A | 10/2005 |
| CN | 101582971 A | 11/2009 |
| JP | 2003-196110 A | 7/2003 |
| JP | 2003-248637 A | 9/2003 |
| JP | 2007-122485 A | 5/2007 |
| JP | 2009-252091 A | 10/2009 |
| JP | 2009-283002 A | 12/2009 |
| JP | 2010-039761 A | 2/2010 |

* cited by examiner

*Primary Examiner* — King Poon
*Assistant Examiner* — Iriana Cruz
(74) *Attorney, Agent, or Firm* — Canon U.S.A., Inc. IP Division

(57) ABSTRACT

An image forming apparatus having a restriction on an amount of resource usage for use in executing an application includes an installation unit configured to install a composite application including a plurality of application modules as one application, a display unit configured to, if, when the composite application installed by the installation unit is activated, the plurality of application modules included in the composite application cannot be activated due to the restriction on the amount of resource usage, activate a predetermined application module in the plurality of application modules and display a symbol corresponding to the activated predetermined application module on a display unit of the image forming apparatus, and an image forming unit configured to execute image processing using an application module corresponding to the symbol, if the symbol displayed by the display unit is selected to instruct the image processing.

5 Claims, 12 Drawing Sheets

FIG.7A

PRIORITY ORDER
701 — 1. TRANSMISSION PROCESSING APPLICATION UNIT
702 — 2. EXTERNAL-SERVICE-A CONNECTION APPLICATION UNIT
703 — 3. EXTERNAL-SERVICE-B CONNECTION APPLICATION UNIT

FIG.7B

COMBINATION OF FUNCTION PROVIDING APPLICATIONS
704 — 1. TRANSMISSION PROCESSING APPLICATION UNIT, EXTERNAL-SERVICE-A CONNECTION APPLICATION UNIT
705 — 2. TRANSMISSION PROCESSING APPLICATION UNIT, EXTERNAL-SERVICE-B CONNECTION APPLICATION UNIT

FIG.9

| NUMBER | APPLICATION NAME | STATUS |
|---|---|---|
| 1 | TRANSMISSION PROCESSING APPLICATION UNIT | ACTIVATE |
| 2 | EXTERNAL-SERVICE-A CONNECTION APPLICATION UNIT | ACTIVATE |
| 3 | EXTERNAL-SERVICE-B CONNECTION APPLICATION UNIT | STOP |

IMAGE FORMING APPARATUS, METHOD FOR CONTROLLING THE IMAGE FORMING APPARATUS, AND STORAGE MEDIUM

BACKGROUND OF THE INVENTION

1. Field of the Invention

The present invention relates to an image forming apparatus which downloads and executes an external application, a method for controlling the image forming apparatus, and a storage medium.

2. Description of the Related Art

It is known that an execution environment (Java™) for an embedded system is configured on a real-time operating system (OS) of image forming apparatuses, an application capable of controlling the image forming apparatuses is externally downloaded, and the application is executed on the configured execution environment. By configuring this execution environment, users can add an application(s) to the image forming apparatuses.

Unlike personal computers (PC), a plurality of applications needs to coexist in a limited resource, in the execution environment on the image forming apparatus. As compared with the PC, the image forming apparatus has a smaller hardware resource, such as a central processing unit (CPU) disposed on-board and a memory. In consideration of usability of a printing process, it is necessary to impose a restriction on the amount of resource usage for an application (s), to ensure the real-time image processing. For example, applications for using a display unit of the image forming apparatus have a restriction. Specifically, the upper limit is given to the number of invoked applications. Japanese Patent Application Laid-Open No. 2009-283002 discusses an image forming apparatus having a restriction on the amount of resource usage for the applications. The amount of resource required by the applications is added together with the amount of resource used for the applications being activated. It is determined as to whether the total amount of resources has reached the preset upper limit. Based on the determined result, the image forming apparatus controls the activation process of the applications. Accordingly, such image forming apparatuses required for real-time image processing have a restriction on activation of applications, when there is no enough space in the limited resource (upper limit of memory, storage, user interface (UI) usage) for activating the applications.

Conventionally, it has been assumed that one application includes one application module. However, one application (hereinafter referred to as a composite application) may include a plurality of application modules. Conventionally, no consideration has been given to how this format of application is activated by the image forming apparatus with the restriction on the resource.

SUMMARY OF THE INVENTION

The present invention is directed to an image forming apparatus having a restriction on an amount of resource usage, and to an image forming apparatus which can adequately activate a composite application.

According to an aspect of the present invention, an image forming apparatus having a restriction on resource usage for an application operating on the image forming apparatus includes an installation unit configured to install a composite application including a plurality of application modules having a similar function as one application, and an activation unit configured to activate a part of the plurality of application modules if, when activating the composite application installed by the installation unit, the plurality of application modules in the composite application cannot be activated due to the restriction on resource usage.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7A is a diagram illustrating the activation priority order of application modules included in an application according to the exemplary embodiment of the present invention, and FIG. 7B is a diagram illustrating a combination of least necessary application modules for providing functions of application modules included in the application according to the exemplary embodiment of the present invention.

FIG. 9 is a diagram illustrating a management table for managing the activation status of UI applications, according to the exemplary embodiment of the present invention.

DESCRIPTION OF THE EMBODIMENT

Various exemplary embodiments, features, and aspects of the invention will be described in detail below with reference to the drawings.

In an assumed system (not illustrated) according to an exemplary embodiment of the present invention, an image forming apparatus and two external servers are connected with each other via the Internet. In the present exemplary embodiment, the number of external servers is two, although other numbers may alternatively be used. Each external server may be a server system including a plurality of servers.

Figure 1:
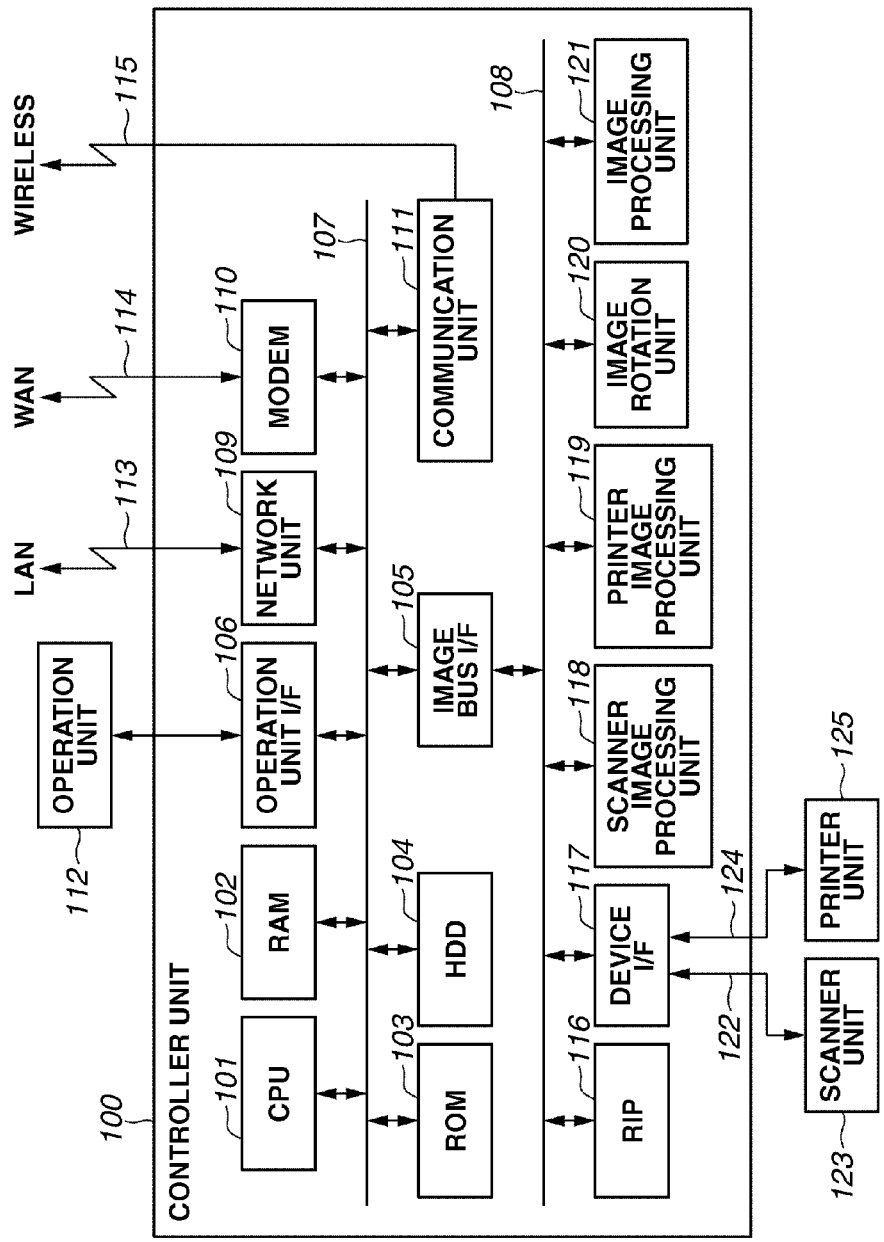
FIG. 1 is a block diagram of an image forming apparatus according to an exemplary embodiment of the present invention.

FIG. 1 is a block diagram illustrating an internal configuration of the image forming apparatus according to the present exemplary embodiment. The image forming apparatus illustrated in FIG. 1 includes a controller unit 100, an operation unit 112, a scanner unit 123, and a printer unit 125. The controller unit 100 controls each unit of the image forming apparatus. The operation unit 112 includes a numeric keypad for inputting numerals, a hard key including a start key for executing processes, and a liquid crystal panel. The operation unit 112 provides a user interface for the user to operate the image forming apparatus. Touching (pressing) an icon or button (or hard key) enables the user to input various settings or information to the image forming apparatus. The icon or button represents each setting item displayed on the touch panel of the operation unit 112. The operation unit 112 corresponds to a display unit.

The scanner unit 123 executes image processing for reading a document, and generating image data from the read document information. The printer unit 125 conveys recording paper, forms image data as a visible image on the recording paper, and prints the formed image.

The controller unit 100 is connected to the scanner unit 123 via a bus 122, and is connected to the printer unit 125 via a bus 124. The controller unit 100 sends instructions for image processing to the scanner unit 123 and the printer unit 125. The controller unit 100 is connected to other units via a local area network (LAN) 113, a wide area network (WAN) 114, and a wireless line 115. The operation unit 100 also controls input/output of image information and device information.

A central processing unit (CPU) 101 is a unit for controlling the entire system. A random access memory (RAM) 102 is a system work memory for the CPU 101 to operate, and is a unit for temporarily storing image data. A read-only memory (ROM) 103 is a unit for storing data, and is a boot ROM. The ROM 103 stores a boot program for the system. A hard disk drive (HDD) 104 is a unit for storing system software, image data, information regarding the entire wireless communication (specifications of wireless communications) and retained by a communication unit 111 as will be described below. The HDD 104 stores also applications operating on a real-time OS 201 and a virtual machine 205, as will be described below.

The image forming apparatus may have more functions by installing applications implemented with desired functions. By installing the applications, application programs for operating various functions on the image forming apparatus can be stored in the RAM 102 and/or HDD 104. As will be described below, when installing the applications in the image forming apparatus, the applications are installed in a virtual environment operating in the OS controlling various functions of the image forming apparatus, rather than directly in the OS.

An operation unit I/F 106 is an interface unit toward the operation unit 112 as a user interface (UI), and outputs data to be displayed on the operation unit 112 thereto. The operation unit I/F 106 has a role in transmitting user-input information from the operation unit 112 to the CPU 101. A network unit 109 is connected to the LAN 113, and externally sends and receives information via a network. A modulator-demodulator (MODEM) 110 is connected to a wide area network (WAN) 114, and inputs and outputs information. The communication unit 111 is connected to a wireless network (WIRELESS) 115 via an antenna (not illustrated), and inputs and outputs information. The communication unit 111 can perform various kinds of wireless communications. Each of the above-described units is arranged on a system bus 107.

An image bus interface (I/F) 105 is connected to the system bus 107 and an image bus 108 for transferring image data at high speed, and is a bus bridge for converting a data configuration. The image bus 108 is defined as a peripheral components interconnect (PCI) bus or by IEEE1394.

Of units arranged on the image bus 108, a raster image processor (RIP) 116 rasterizes page-description language (PDL) codes to a bitmap image. A device I/F unit 117 connects the scanner unit 123 or printer unit 125 to the controller unit 100, for performing synchronous/asynchronous conversion of image data.

A scanner image processing unit 118 corrects, processes, and edits input image data. A printer image processing unit 119 corrects the print-output image data and transforms the resolution for the print-output image data, according to the printer unit 125. An image rotation unit 120 rotates image data. An image processing unit 121 executes a compression/decompression process (Joint Photographic Experts Group (JPEG), Joint Bi-level Image Experts Group (JBIG), Modified Modified READ (MMR), Modified Huffman (MH)), or executes a format conversion process (Portable Document Format (PDF), Tagged Image File Format (TIFF), Optical Character Recognition (OCR), encryption), for image data.

Figure 2:
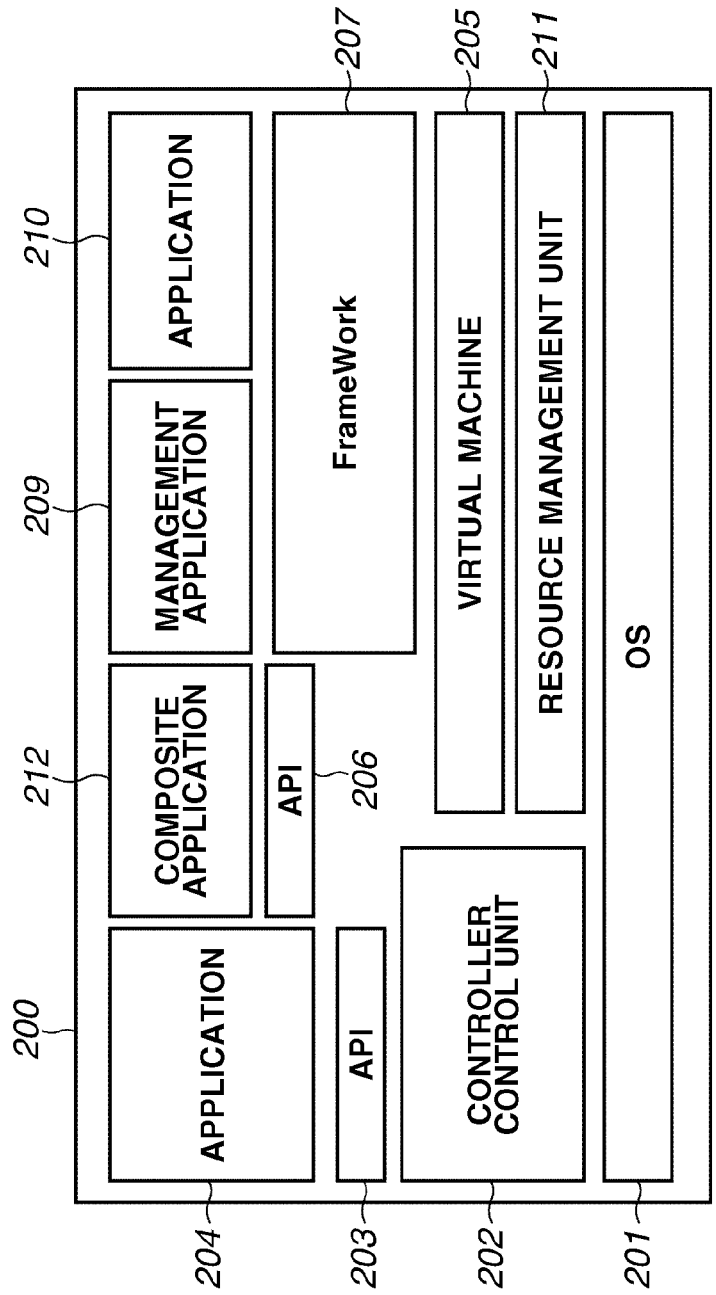
FIG. 2 is a software block diagram of the image forming apparatus according to the exemplary embodiment of the present invention.

A software configuration 200 of the image forming apparatus illustrated in FIG. 1 will now be described with reference to FIG. 2. The software configuration 200 illustrated in FIG. 2 is implemented by loading, into the RAM 102, programs for realizing various functions stored in the HDD 104 of the image forming apparatus, and by the CPU 101 executing the programs.

The OS 201 is a first execution environment for controlling the entire image forming apparatus, and sends instructions to each unit or CPU that can control various functions of the image forming apparatus in real time. The OS 201 includes a group of libraries. The group of libraries can critically control each function including an optional unit(s) of a copying machine and an expansion card(s). The OS 201 includes a group of modules for providing interface commands to the applications operating thereon. A controller control unit 202 operates on the OS 201, and includes modules for controlling the scanner unit 123 and the printer unit 125.

An application programming interface (API) 203 realizes a process for accessing the controller control unit 202 and a function for sending control commands to a unit connected to a network via the network unit 109, in response to an instruction from the applications operating on the OS 201. The application 204 operates on the OS 201, and requests the controller control unit 202 via the API 203 for various processes.

A virtual machine 205 is a second execution environment for executing a particular application(s), and is implemented by, for example, a Java (registered trademark) virtual machine (s). An API 206 provides a function for the applications on the virtual machine 205 as the second execution environment to access the controller control unit 202 operating on the real-time OS 201 as the first execution environment. Specifically, the API 206 includes modules for providing various functions in response to a call from the applications operating on the virtual machine 205. The API 206 realizes a function of a conversion module for calling the API 203 and a function for sending control commands to units connected to a network via the network unit 109.

A framework module 207 has a function for generally controlling the applications on the second execution environment 205. A management application 209 manages the applications operating on the second execution environment 205. The management application 209 provides a function for downloading, uploading, deleting, invalidating, and installing an application 210 and a composite application 212, in cooperation with the framework module 207.

The management application 209 and the application 210 operate on the second execution environment 205, and request the controller control unit 202 via the API 206 for various processes.

A resource management unit 211 manages resources used by the virtual machine 205 as the second execution environment, and operates on the real-time OS 201 realizing the first execution environment. The resource management unit 211 restricts the amount of resource usage for each corresponding module, when the resource(s) is used by the application(s) operating on the virtual machine 205 realizing the second execution environment, the API 206, the framework 207, and the OS 205. Specifically, the amount of resource usage of the image forming apparatus is restricted in such a manner that each of the modules cannot use of greater than a predetermined amount of resource. For example, when loading the application(s) operating on the virtual machine 205 into the RAM 102, the loading of the applications is restricted, if a preset number of invoked applications have already been loaded into the memory. In another example, the execution of the applications may be restricted even though the applications are loaded into the RAM 102, because the resource for the CPU executing the loaded applications is not enough. In the present exemplary embodiment, the preset number of invoked applications implies a restriction imposed on the applications operating on the virtual machine 205, and the number of twenty, as an example. Thus, if twenty applications operating on the virtual machine 205 have already been loaded into the RAM 102, no more applications residing on the virtual machine 205 can be activated.

Figure 3:
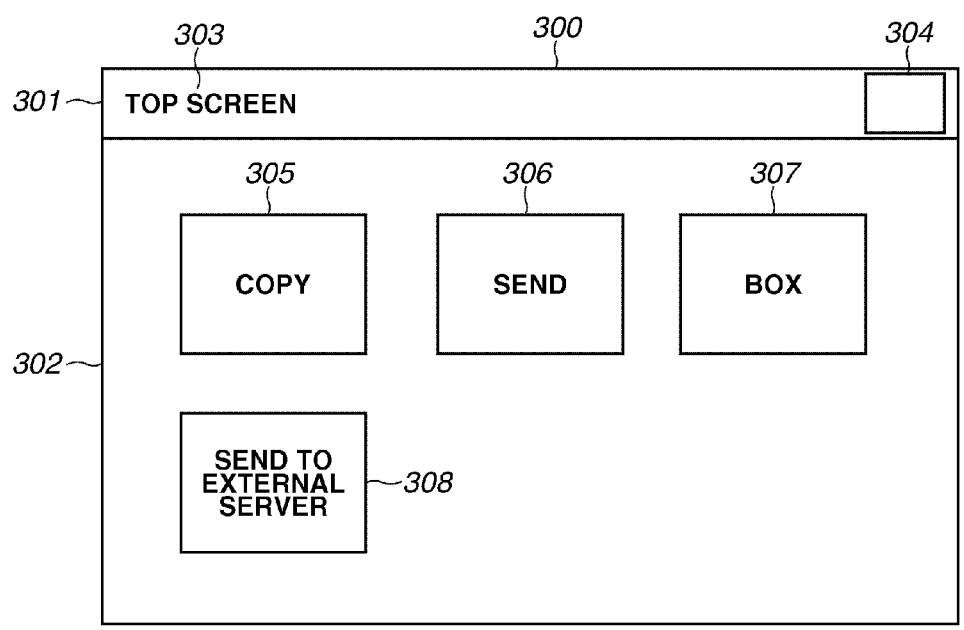
FIG. 3 is a diagram illustrating a display screen displayed on a touch panel of an operation unit according to the exemplary embodiment of the present invention.

FIG. 3 is a diagram illustrating an example of a display screen displayed on the touch panel of the operation unit 112. As illustrated on a top screen 300 illustrated in FIG. 3, the display screen displayed on the touch panel of the operation unit 112 includes a common area 301 and a function area 302. The common area 301 displays the common contents of display screens, while the function area 302 displays different contents of display screens. The top screen is displayed first on the display unit of the image forming apparatus, when the image forming apparatus is executable by turning on the apparatus.

The common area 301 includes a title bar 303 and a menu button 304. The title bar 303 is to describe the displayed screen, while the menu button 304 is to display a menu for configuration registration and function setting according to the presently displayed screen. The function area 302 includes displayed buttons for switching to screens corresponding to applications for "Copy" and "Send". The application buttons in the present exemplary embodiment include a "Copy" application button 305, a "Send" application button 306, a "Box" application button 307, and a "Send" application button 308 for external servers. The applications corresponding to any buttons other than the "Send" application button 308 for external servers are those operating on the first execution environment. A button corresponding to a new application is displayed in the function area 302 on the top screen 300, when this application is installed in the image forming apparatus, loaded into the RAM 102, and adequately activated. Each of the applications is loaded into the RAM 102 at the time the image forming apparatus is activated. The buttons registered in the function area 302 correspond both to the applications operating on the OS 201 and the applications operating on the virtual machine 205.

Figure 4:
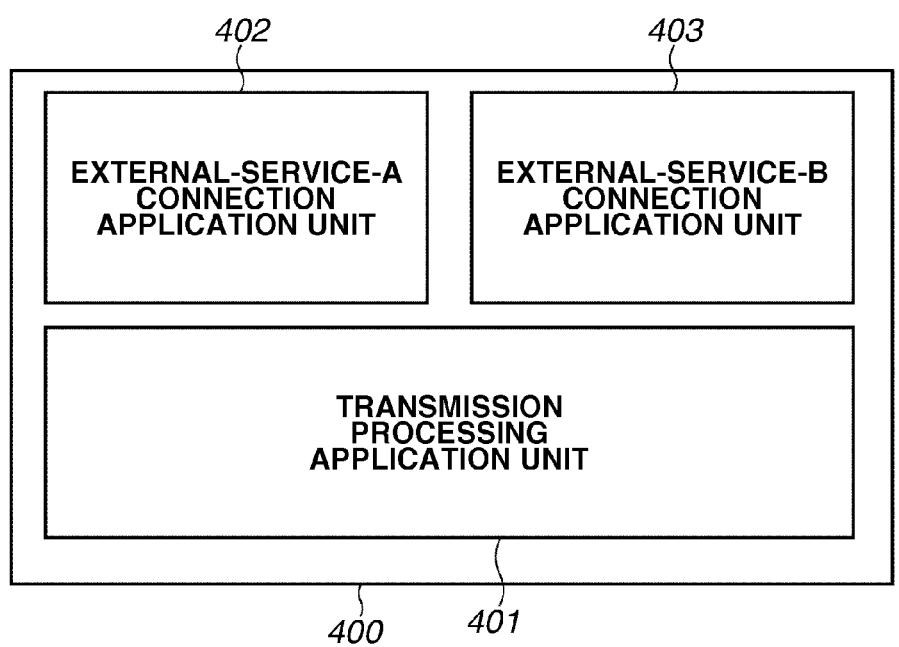
FIG. 4 is a basic block diagram of an application according to the exemplary embodiment of the present invention.

FIG. 4 is a basic block diagram 400 of the composite application 212 according to the present exemplary embodiment. As illustrated in FIG. 4, the composite application 212 includes a plurality of application modules. The composite application 212 is connected to an external server connected via a network from the image forming apparatus, and realizes a function for sending a scanned image to the external server. The composite application 212 realizes also a function for receiving image data from an external server. The composite application 212 includes three application modules: a transmission processing application unit 401, an external-service-A connection application unit 402, and an external-service-B connection application unit 403. The application modules are applications for providing different UIs. The application modules are packaged, and each independent group of modules corresponds to each application module. The modules are packaged and set as a group of modules for realizing a particular function, thereby realizing an independent application configuration.

Figure 5:
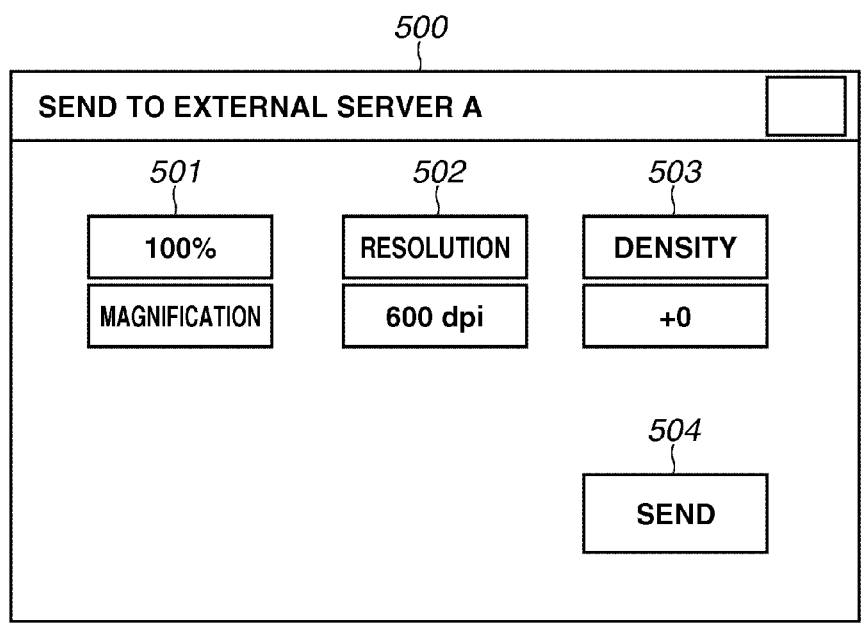
FIG. 5 is a diagram illustrating a UI displayed by an external-service-A connection application unit according to the exemplary embodiment of the present invention.

The external-service-A connection application unit 402 is an application module for communicating with an external server A (not illustrated), and displays a UI 500 illustrated in FIG. 5 on the operation unit 112. The external server A is based on an assumption of a cloud computing environment, and provides an external service A using the cloud computing environment.

Reference numeral 501 in the UI 500 represents an item for specifying the scanning magnification, reference numeral 502 represents an item for specifying the resolution, and reference numeral 503 represents an item for specifying the density. Reference numeral 504 represents a button for executing transmission. When a user presses the "Send" button 504 for transmission toward the external service A, a document is scanned, and image data corresponding to the scanned document is sent to the external server A. The external-service-A connection application unit 402 includes a communication module for communicating with the external service A, and sends the scanned image through the communication with the external server A. At this time, the external-service-A connection application unit 402 calls the transmission processing application unit 401. The called transmission processing application unit 401 displays a UI 600 illustrated in FIG. 6 on the display unit, to inform the user that the scanned document image is being sent. More specifically, the composite application 212 activates two application modules of the external-service-A connection application unit 402 and the transmission processing application unit 401, executes image processing, and executes a process for sending the result of the image processing to the external server. As described above, the external-service-A connection application unit 402 can execute image processing for image data and print the processed image, upon reception of the image data from an external server. In this case, the external-service-A connection application unit 402 displays a UI (not illustrated) for printing that differs from the UI illustrated in FIG. 5.

The external-service-B connection application unit 403 is an application module for communicating with an external server B (not illustrated), and displays a UI (not illustrated) for sending a scanned image to the external server B. The external server B is based on an assumption of a cloud computing environment, and is provided as an external service B using the cloud computing environment. The difference between the external service A and the external service B is the different kind of storage data format, for example. Unlike the external service A, the external service B can store a plurality of kinds of data formats. Thus, the UI displayed by the external-service-B connection application unit 403 includes also an item for selecting a data format, other than the items illustrated in FIG. 5. The external-service-B connection application unit 403 can also receive image data from the external server, execute image processing on the image data, and print the processed image.

Figure 6:
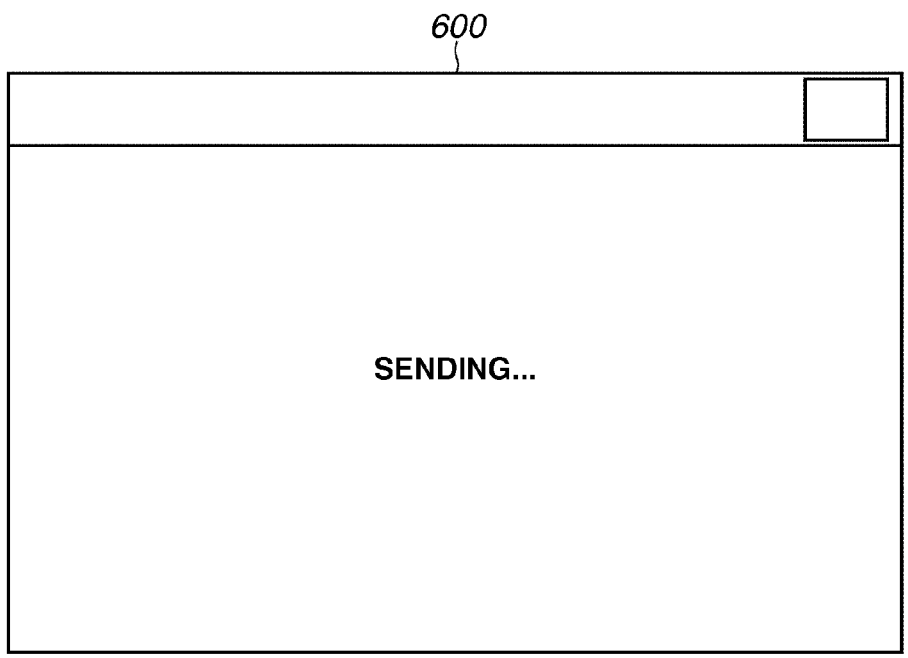
FIG. 6 is a diagram illustrating a UI displayed by a transmission processing application unit according to the exemplary embodiment of the present invention.

The external-service-B connection application unit 403 includes a communication module for communicating with the external service B, communicates with the external server B, and sends a scanned image. At this time, the external-service-B connection application unit 403 calls the transmission processing application unit 401. The called transmission processing application unit 401 displays a UI representing that the scanned document image is being sent, as illustrated in FIG. 6. Like the application unit 402, the external-service-B connection application unit 403 is an application module operating in cooperation with the transmission processing application unit 401. In this manner, the application module for communicating with a system connected via a network is called an individual application module, while a module which is commonly used between individual application modules is called a common application module. The composite application 212 includes individual application modules and a common application module. As described above, each of the individual application modules has a function for displaying the UI. However, different UIs are displayed according to the external services provided by the connected external servers. The communication modules of the individual application modules communicate with the respective external servers to provide respective external services, thus communicating with communication protocols corresponding to the respective external servers.

The two external servers providing the external services A and B are based on a cloud computing environment. The two external servers have a known configuration of the information processing unit, and provide not only a service for storing data in response to an external request, but also a service for sending the stored data to a request source.

FIG. 7A is a diagram illustrating the activation priority order of application modules included in the composite application 212. As illustrated with reference numerals 701, 702, and 703, the priority order of activation is set in the order of the transmission processing application unit 401, the external-service-A connection application unit 402, and the external-service-B connection application unit 403. The reason why the transmission processing application unit 401 has the highest priority is that it is a common application module which is used commonly by a plurality of application modules. The common application module has a higher priority than the individual application modules. This reason will be discussed below. The reason why the external-service-A connection application unit 402 has the second highest priority is based on assumption that the user more frequently uses the external service A than the external service B. This priority order may statically be retained by the applications. However, the activation priority order of the entire application modules may possibly be changed.

FIG. 7B illustrates a combination of least necessary application modules for providing functions of individual applications included in the composite application 212. As illustrated with reference numeral 704 in FIG. 7B, to provide a function 1, the transmission processing application unit 401 and the external-service-A connection application unit 402 are both necessary. As illustrated with reference numeral 705, to provide a function 2, the transmission processing application unit 401 and the external-service-B connection application unit 403 are necessary. For the user to receive the function provided by the individual application modules, the common application module is necessary, as apparent from FIG. 7B. The common application module has a function necessary for realizing the services provided by the respective individual application modules. The developer independently develops a commonly used module, in consideration of development efforts. This consideration is made based on some issues. Specifically, the development efforts increase, and the code of the module becomes too large, when each of the individual application modules has an embedded function of the common application module. That is, the too large code influences the resource, for the image forming apparatus which operates with a limited amount of resource.

Figure 8:
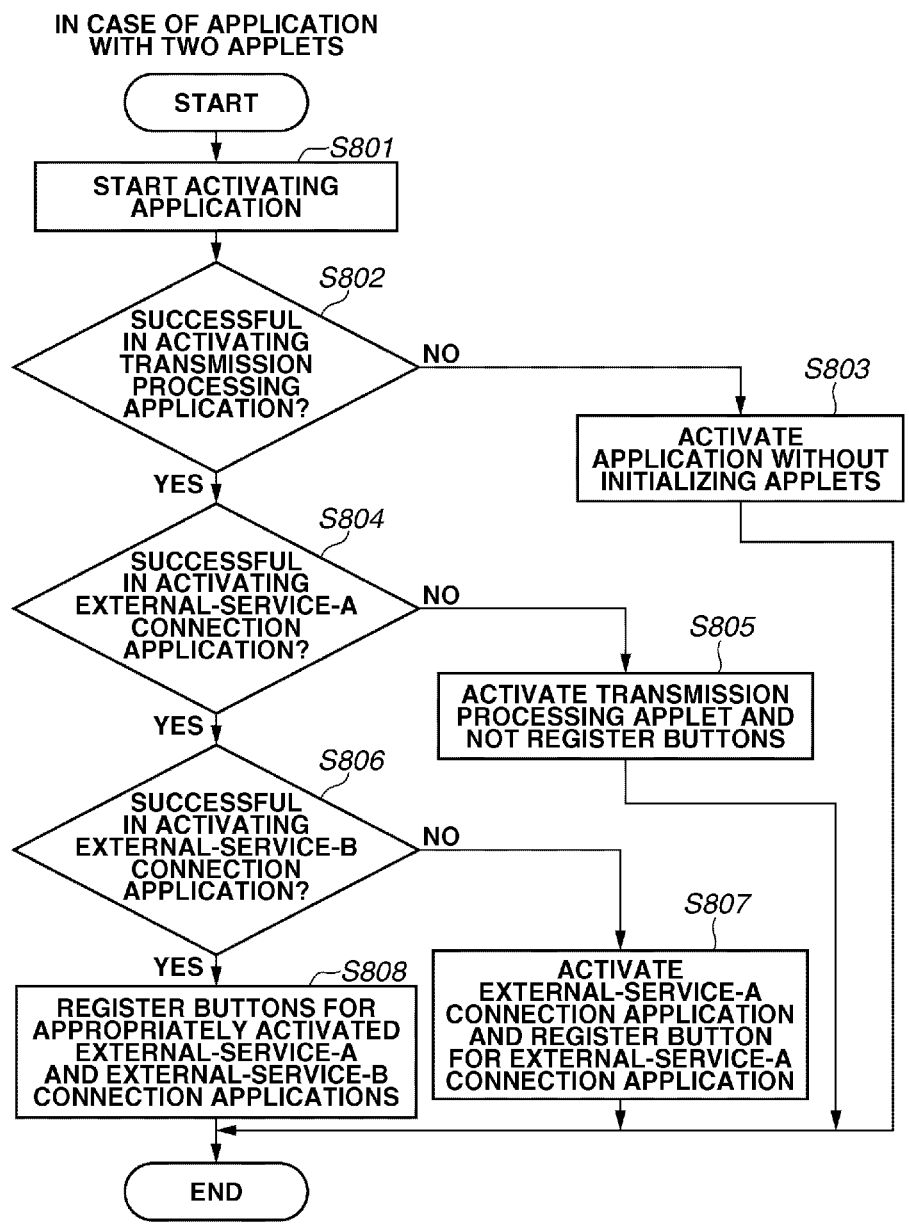
FIG. 8 is a flowchart illustrating an activation process of the application according to the exemplary embodiment of the present invention.

FIG. 8 is a flowchart illustrating a process for activating the composite application 212 according to the present exemplary embodiment. In step 801, the composite application 212 starts the activation process. In step S802, the composite application 212 confirms activation of the transmission processing application unit 401 having the priority "1". In this case, confirmation of activation implies that the resource management unit 211 confirms that activation of the application module is not limited. When the transmission processing application unit 401 is not successfully activated in step S802, then in step S803, the composite application 212 activates the application without initializing any of the application modules and ends the activation process. In this case, the activation without initialization implies a particular state in which a particular module part is loaded into the RAM 102. This module part is for realizing a part of functions included in the application module. Needless to say, in this state, the user cannot get the function provided by the application module.

When the transmission processing application unit 401 is successfully activated in step S802, the processing proceeds to step S804. In step S804, the composite application 212 confirms activation of the external-service-A connection application unit 402 having the second highest priority. In step S804, when the external-service-A connection application unit 402 cannot be activated, the composite application 212 initializes and activates only the transmission processing application unit 401 in step S805. At this time, the composite application 212 ends the activation process without registering any buttons in the top screen 300. The reason why no buttons are registered in the top screen 300 is that the user cannot be provided with a service using the external service only through the transmission processing application unit 401. When the external-service-A connection application unit 402 is successfully activated in step S804, the processing proceeds to step S806.

In step S806, the composite application 212 confirms activation of the external-service-B connection application unit 403 having the third highest priority. When the external-service-B connection application unit 403 cannot successfully be activated in step S806, the composite application 212 initializes and activates the transmission processing application unit 401 and the external-service-A connection application unit 402 in step S807. At this time, the composite application 212 registers a button for using the external service A in the top screen 300. This button corresponds to the external-service-A connection application unit 402. When the external-service-B connection application unit 403 is successfully activated in step S806, the composite application 212 initializes and activates the following three application modules in step S808. The three application modules include the transmission processing application unit 401, the external-service-A connection application unit 402, and the external-service-B connection application unit 402. The composite application 212 registers a button for using the external service A and a button for using the external service B, in the top screen 300, and ends the activation process.

FIG. 9 illustrates a management table for managing the activation status of each application module activated in FIG. 8. This management table is managed by the management application 209. In FIG. 9, the transmission processing application unit 401 and the external-service-A connection application unit 402 are successfully activated, while the external-service-B connection application unit 403 is in a stop status.

Figure 10:
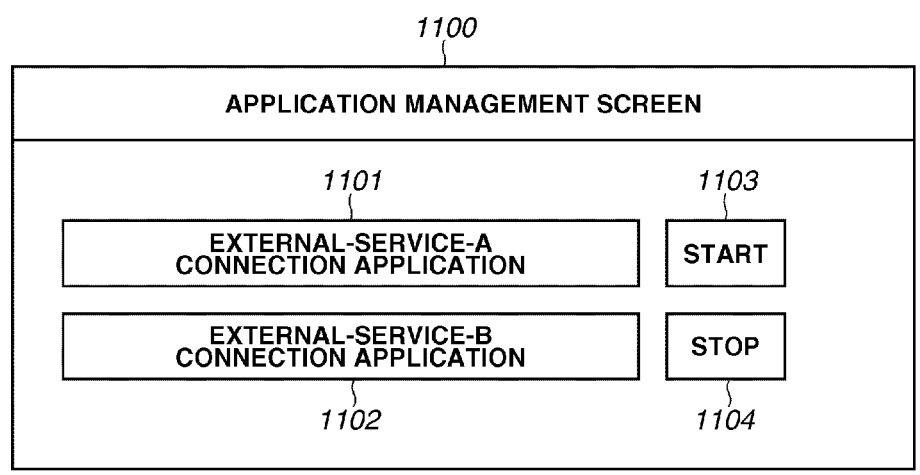
FIG. 10 is a diagram illustrating a UI displayed by a servlet application that can execute a reinitialization process for each UI application failed to activate, according to the exemplary embodiment of the present invention.

FIG. 10 illustrates a UI screen for a servlet application that can instruct a reactivation process for the application module failed to be activated, of the application modules activated in FIG. 8. In an application management screen 1100, a "Start" button 1103 is effective, because the external-service-A connection application 1101 is in a stop status. Since the external-service-B connection application 1102 is in a "Start" status, a "Stop" button 1104 is effective. In this state, if the "Start" button is pressed, a corresponding application module is initialized and activated. On the other hand, if the "Stop" button is pressed, a corresponding application module stops. This screen is generated with an application called a servlet application (not illustrated) operating on the virtual machine 205. The servlet application generates the screen illustrated in FIG. 10 in response to an external screen request, and provides the external request source with the generated screen. In FIG. 10, only the composite application 212 is displayed. However, any other applications operating on the virtual machine 205 may be displayed. In this case, another application operating on the virtual machine 205 can be instructed to be selected and stopped, thereby activating the composite application 212.

Figure 11:
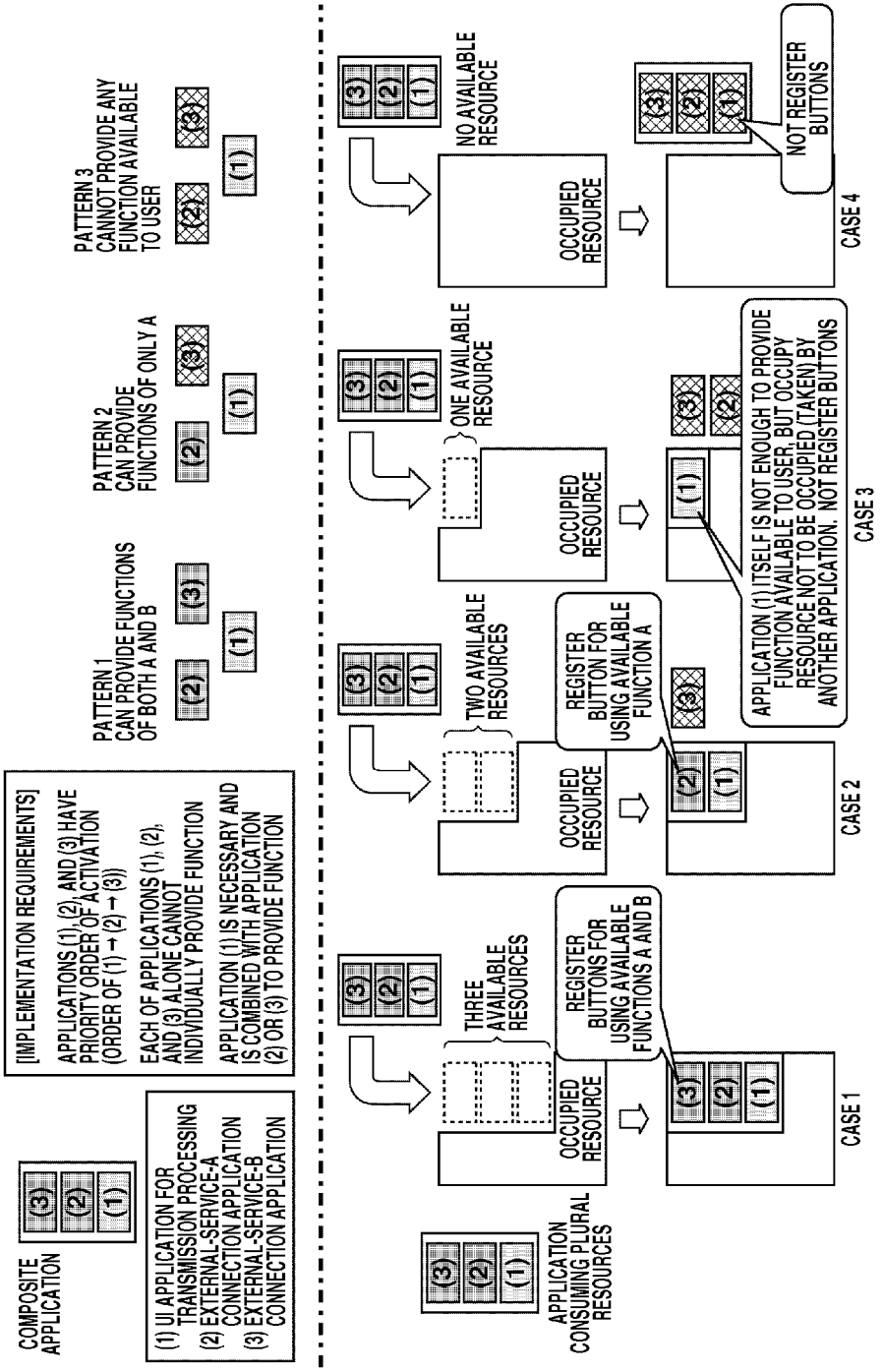
FIG. 11 is a diagram illustrating the main point according to the exemplary embodiment of the present invention.
Figure 12A:
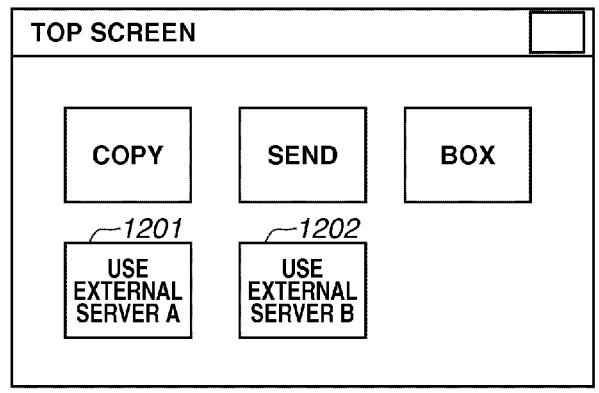
FIG. 12A is a diagram illustrating a symbol display of Case 1.
Figure 12B:
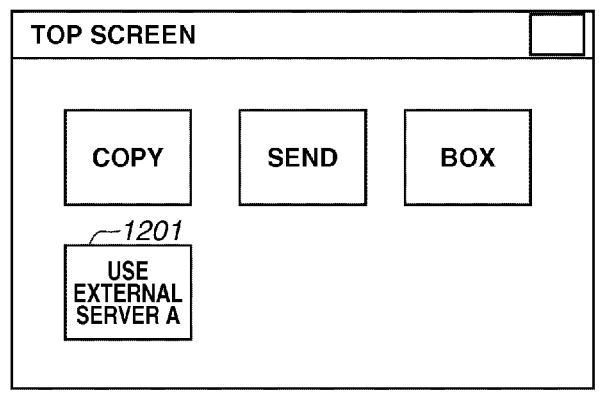
FIG. 12B is a diagram illustrating a symbol display of Case 2.
Figure 12C:
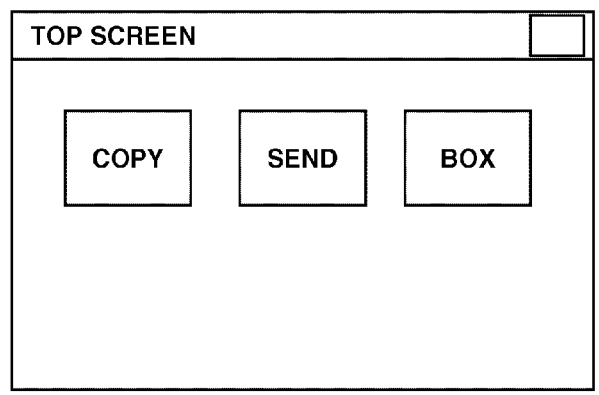
FIG. 12C is a diagram illustrating a symbol display of Cases 3 and 4.

Accordingly, the descriptions have been made to the activation of the composite application according to the present exemplary embodiment. Finally, the main point of the present exemplary embodiment will be discussed with reference to FIGS. 11 and 12A to 12C. FIG. 11 is a diagram illustrating the main point of the present exemplary embodiment. FIGS. 12A to 12C are diagrams illustrating the display of symbols (icons) upon activation of the application module.

The composite application includes a plurality of application modules. Each of the application modules realizes a plurality of functions. The application modules are classified as a common application module and individual application module. The individual application module can provide a user with a service based on an external service, in cooperation with the common application module. This service is to store scanned image data in an external server, download and print the image data stored in the external server. The individual application module includes a communication module for communication with an external server(s) and a display module for displaying a UI screen based on the external service of a communication target. The common application module includes a display module for displaying a UI screen representing that communication is being made with an external server, in response to a call from the individual application module.

In Case 1 where all application modules of the composite application can be activated, symbols (icons) 1201 and 1202 are displayed as illustrated in FIG. 12A. The symbols correspond to all the activated individual application modules. A part of the application modules of all application modules of the composite application can be activated, in any of the following two cases (Case 2 and Case 3). Specifically, the first case is Case 2 where the entire common application modules and at least one individual application module can be activated. The second case is Case 3 where no one individual application module can be activated, or where a part of the common application modules cannot be activated.

In Case 2, the common application module and the individual application module with a high priority are activated. As illustrated in FIG. 12B, the symbol 1201 is displayed. This symbol 1201 corresponds to a predetermined individual application module that can be activated. In Case 3, the common application module to be activated is activated, without activating the individual application module. As illustrated in FIG. 12C, no symbol corresponding to the individual application module is displayed. In Case 3, the reason why only the common application module is activated is to avoid being occupied by any applications other than the composite application 212. When occupied by any other application, it takes further more time to activate the composite application 212. In the present exemplary embodiment, like the composite application 212, the applications including a plurality of application modules have a higher priority of activation than another application not being activated yet. In Case 4 where no application modules of the composite application can be activated, no application modules are activated. As illustrated in FIG. 12C, no symbol corresponding to the individual application is displayed.

When a symbol for using an external service displayed on the display unit is pressed, a corresponding individual application module displays a UI. The image forming apparatus receives image data, for example, from an external server, and prints the received image data. At this time, the individual application module operates in cooperation with the common application module. Accordingly, when any of various instructions is issued upon pressing the symbol, the image forming apparatus executes image processing before or after data communications with the external server.

Accordingly, the descriptions have been made to the image forming apparatus, a method for controlling the image forming apparatus, and a program process for controlling the image forming apparatus to execute the controlling method, according to the present exemplary embodiment. According to the present exemplary embodiment, in the image forming apparatus with a restriction on the amount of resource usage, the composite application can appropriately be activated.

In the present exemplary embodiment, the descriptions have been made to the composite application including both the common application module and the individual application module(s). However, the composite application may include only individual application modules. In this case, the resource of the image forming apparatus may be restricted. However, the present invention is also applicable.

In the present exemplary embodiment, each of the common application module and the individual application module includes a group of least necessary modules. However, each of the common application module and the individual application module may include any other group of modules.

Embodiments of the present invention can also be realized by a computer of a system or apparatus (or devices such as a CPU or micro-processing unit (MPU)) that reads out and executes a program of computer executable instructions recorded on a memory device to perform the functions of any of the above-described embodiment (s), and by a method, the steps of which are performed by a computer of a system or apparatus by, for example, reading out and executing the program recorded on a memory device to perform the functions of any of the above-described embodiment (s). For this purpose, the program may be provided to the computer for example via a network or from a recording medium of various types serving as the memory device (e.g., computer-readable medium). The program may be provided to the computer, for example, via a network or from a recording medium of various types serving as the memory device (e.g., computer-readable medium). The recording medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. Such a system or apparatus, and the computer-readable medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-189515 filed Aug. 26, 2010, which is hereby incorporated by reference herein in its entirety.

What is claimed is:

1. An image forming apparatus having a restriction on an amount of resource usage for use in executing an application, the image forming apparatus comprising:
   an installation unit configured to install a composite application including a plurality of application modules as one application;
   a display unit configured to, if, when the composite application installed by the installation unit is activated, the plurality of application modules included in the composite application cannot be activated due to the restriction on the amount of resource usage, activate a predetermined application module in the plurality of application modules and display a symbol corresponding to the activated predetermined application module on a display portion of the image forming apparatus; and
   an image forming unit configured to execute image processing using an application module corresponding to the symbol, if the symbol displayed by the display unit is selected to instruct the image processing;
   wherein the plurality of application modules includes a common application module and an individual application module, the individual application module being used to communicate with a system connected to the image forming apparatus via a network, the common application module being used to display information representing that the individual application module communicates with the system, and the individual application module displaying, for a user, information representing that communication is made with the system using the common application module, and
   wherein, if the plurality of application modules included in the composite application cannot be activated due to the restriction on the amount of resource usage, the display unit activates both of the common application module and a predetermined individual application sub-module included in the individual application module, and displays a symbol corresponding to the activated predetermined individual application sub-module.

2. The image forming apparatus according to claim 1, wherein, when both of the common application module and the individual application module cannot be activated due to the restriction on the amount of resource usage, the display unit activates the common application module without activating the individual application module.

3. The image forming apparatus according to claim 2, wherein the composite application is an application operating on a second execution environment realized by a virtual machine operating on a first execution environment.

4. A method for controlling an apparatus having a restriction on an amount of resource usage for an application operating on the apparatus, the method comprising:
   installing a composite application including a plurality of application modules having a similar function as one application; and
   activating a part of the plurality of application modules if, when activating the installed composite application, the plurality of application modules included in the composite application cannot be activated due to the restriction on the amount of resource usage;
   wherein the plurality of application modules includes a common application module and an individual application module, the individual application module being used to communicate with a system connected to the apparatus via a network, the common application module being used to display information representing that the individual application module communicates with the system, and the individual application module displaying, for a user, information representing that communication is made with the system using the common application module, and
   wherein, if the plurality of application modules included in the composite application cannot be activated due to the restriction on the amount of resource usage, the display unit activates both of the common application module and a predetermined individual application sub-module included in the individual application module, and displays a symbol corresponding to the activated predetermined individual application sub-module.

5. A non-transitory machine readable storage medium storing a program for causing an image forming apparatus to execute the method according to claim 4.

* * * * *